Patented Dec. 20, 1938

2,140,763

UNITED STATES PATENT OFFICE 2,140,763

GREEN ORTHOHYDROXYAZO DYES

Max Raeck, Dessau-Haideburg, in Anhalt, and Werner Keller, Dessau, in Anhalt, Germany, assignors to General Aniline Works, Inc., New York, N. Y., a corporation of Delaware No Drawing. Application February 12, 1936, Serial No. 63,640. In Germany May 10, 1933

2 Claims. (Cl. 260—198)

Our present invention relates to a process for manufacturing valuable new ortho-hydroxyazo dyes and to the products obtainable according to this process.

We have found that valuable dyes suitable for dyeing wool, are obtainable by diazotizing a 2-amino-1-hydroxybenzene of the general formula

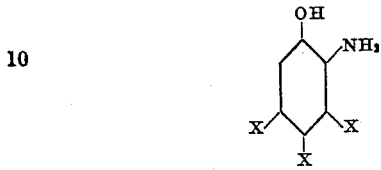

in which X means halogen, and coupling the diazo compound with a peri-arylamino-1-hydroxynaphthalene monosulfonic acid. The dyes thus produced dye wool treated with a chromium mordant, or when dyed according to the single bath process in the presence of a chromium mordant or when after-treated with a chromium mordant, greenish blue to green tints which are distinguished by their fastness.

The following example serves to illustrate our invention, the parts being by weight:—

*Example.*—212.5 parts of 3,4,5-trichloro-2-amino-1-hydroxybenzene are diazotized with 500 parts of hydrochloric acid of 12° Bé. and 69 parts of sodium nitrite. The diazo compound is neutralized by addition of sodium carbonate. It is allowed to run into a solution of 345 parts of 1-(4'-methylphenyl)-amino-8-hydroxynaphthalene-4-sulfonic acid, which likewise is neutralized with sodium carbonate. The dye is finished in the usual manner. It dyes wool in the presence of a metachrome mordant clear bluish green tints of excellent fastness.

It is obvious that our invention is not limited to the foregoing example or to the specific details given therein and we may use, for instance, as azo component a peri-arylamino hydroxynaphthalene monosulfonic acid which corresponds to the general formula

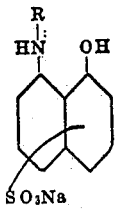

in which R means phenyl, alkylphenyl, alkoxyphenyl, halogenophenyl.

The present application is a continuation-in-part of our application Serial No. 716,429, filed March 19, 1934.

What we claim is:—

1. The new azo dye which corresponds to the formula

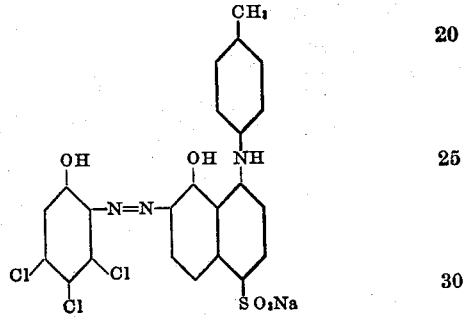

said dye dyeing wool in the presence of a metachrome mordant clear bluish-green tints of excellent fastness to light.

2. The process which comprises diazotizing 3,4,5-trichloro-2-amino-1-hydroxybenzene and coupling the diazo compound with 1-(4'-methylphenyl)-amino-8-hydroxynaphthalene-4-sulfonic acid in the presence of sodium carbonate.

MAX RAECK.
WERNER KELLER.